Patented Apr. 17, 1945

2,374,136

UNITED STATES PATENT OFFICE 2,374,136

CATALYTIC REACTION OF ISOCYANATES WITH ORGANIC COMPOUNDS

Henry S. Rothrock, Wilmington, Del., assignor to E. I. du Pont de Nemours & Company, Wilmington, Del., a corporation of Delaware No Drawing. Application November 1, 1940, Serial No. 363,927

10 Claims. (Cl. 260—22)

This invention relates to the catalysis of chemical reactions and more particularly to reactions involving isocyanates or isothiocyanates.

This case is a continuation-in-part of application Serial No. 304,265 filed November 13, 1939.

The isocyanates and isothiocyanates, and particularly the diisocyanates, are known to yield valuable products with a large number of active hydrogen-containing substances. Substances of this kind include diamines, glycols, polyester-amides, alkyd resins, phenol-formaldehyde resins, and the ether resins described in Patent 2,060,715. It is desirable that the reaction between these substances and the isocyanates or isothiocyanates take place more quickly than heretofore, particularly when the diisocyanates are used in coating compositions with the mentioned polymeric substances with the purposes of effecting the reaction in the drying or baking of the film.

This invention has as an object a method for accelerating the reaction between isocyanates or isothiocyanates and active hydrogen-containing substances. Other objects will appear hereinafter.

These objects are accomplished by carrying out the reaction between the isocyanate or isothiocyanate and an active hydrogen-containing substance in the presence of a metallic drier, i. e. an oil-soluble metallic salt of the kind commonly used as catalysts in the hardening of drying oil films.

The active hydrogen-containing substances are substances which contain reactive hydrogen as determined by the Zerewitinoff method. This method is described in J. Am. Chem. Soc. 49, 3181 (1927). Typical groups containing reactive hydrogen are hydroxyl, carboxyl, primary amino, and secondary amino groups.

The isocyanates and isothiocyanates may be referred to generally as organic compounds containing at least one reactive group of the formula —N=C=X in which X is oxygen or sulfur. These compounds and a small amount of the metallic drier, preferably the organic compounds of cobalt, manganese or lead, are mixed with a substance having one or more groups containing active hydrogen, i. e. groups reactive towards —N=C=X groups. In most instances it is desirable to heat the mixture in order to accelerate the reaction. When the active hydrogen-containing substances is monomeric and contains only one active hydrogen-containing group, the product is in general monomeric. On the other hand, if both of the reactants are bifunctional, the product is polymeric; and, if one of the reactants is polymeric, the product is a modified polymer of higher molecular weight. The isocyanate and isothiocyanate compounds described herein are free from reactive groups other than groups of the above mentioned formula.

Since the present process is most advantageously practiced with the diisocyanates, this invention will be more particularly described in connection with these compounds. Because of the wide number of applications to which the reaction between a diisocyanate and an active hydrogen-containing substance has been put, the use of the metallic driers as catalysts for the acceleration of these reactions is quite varied and the method of application is dependent upon the field in which they are being used. For example, in the use of these driers to catalyze the reaction between diisocyanates and hydroxyl-containing and/or carboxyl-containing alkyd resins the diisocyanate, the metallic drier, and the alkyd-type resin are mixed together, formed into a film or coating, and allowed either to air dry or to bake in an oven. It is also possible to heat the mixture of alkyd resin and modifier before flowing the film. When this is done, it is often possible to employ alkyd resins at an intermediate stage of condensation with the result that the time required to manufacture the resins is decreased. To avoid decomposition of the diisocyanate by water no appreciable amount of water should be present in the coating composition. It has been found, however, that the commercially available enamels based on fatty acid modified alkyd resin vehicles and a hydrocarbon solvent may be employed without any dehydrating treatment.

The present invention offers a convenient method for the preparation of tough high molecular weight products by reacting the diisocyanate with low molecular weight linear polymers comprising the reaction product of a dibasic carboxylic acid and at least one complementary bifunctional compound in which at least one functional group is alcoholic. This class of polymers includes polyesters derived from dibasic acids and glycols and polyester-amides, e. g. those derived from dibasic acids and aminoalcohols, those derived from dibasic acids, glycols and diamines, and those derived from dibasic acids, glycols and aminoacids. In the present process these low molecular weight polymers are treated with up to about 10%, preferably 3 to 7%, of a diisocyanate in the presence of a metallic drier at such a temperature that the reaction will take place. At temperatures between 170–200° C. the reaction is quite rapid, taking about from 5–20 minutes.

At lower temperatures (100–150° C.) the reaction will proceed, but a longer heating period is required. The reaction converts the low molecular weight polymer from a weak product to one which is tough and capable of being formed into useful films. The reaction between the partially formed or low molecular weight polymer and the diisocyanate may be conducted either in the presence or absence of inert solvents or diluents and at atmospheric, superatmospheric, or subatmospheric pressure. Modifying agents such as plasticizers, fillers, and pigments may be incorporated with the reaction mixture before the addition of the diisocyanate.

The practice of this invention is further illustrated by the following examples in which the parts are by weight.

Example I

This example illustrates the marked acceleration of reaction rate which metallic driers exert on the reaction between a diisocyanate and a monomeric active hydrogen-containing substance (methanol). In a vessel was placed 120 parts of petroleum ether, 6 parts of methanol, 6 parts hexamethylene diisocyanate, and 1 part of a solution of cobalt naphthenate (0.2 per cent metallic cobalt). A control was prepared, omitting cobalt naphthenate. The mixture containing cobalt naphthenate gave a precipitate of a reaction product (the corresponding urethane) in ½ hour, whereas the control required 3 hours. Similar experiments showed that manganese naphthenate, lead naphthenate, and sodium methoxide also catalyzed this reaction. The addition of drier alone to a mixture of methanol and petroleum ether does not cause any precipitation.

Example II

The following compositions were prepared: (1) Ten parts of 50 per cent solution in xylene of a castor oil modified alkyd resin and 1.4 parts of a 20 per cent solution of hexamethylene diisocyanate in dry xylene. The alkyd resin had the following composition: Castor oil, 42 per cent; glycerol, 6 per cent; glycerol phthalate, 52 per cent. (2) 5.7 parts of composition 1 plus 0.6 part of a solution of cobalt naphthenate containing 0.2 per cent of metallic cobalt.

The films prepared from these compositions were baked for ½ hour at 100° C. Number 1 gave a colorless tacky film, whereas number 2 gave a colorless film which was not tacky. The drier alone has no effect on the castor oil modified alkyd resin.

Example III

To 5 parts of a polyether resin prepared by the method of Example I of Patent 2,057,676 dissolved in 20 parts of toluene is added 0.28 part of 3 per cent cobalt naphthenate solution and 0.20 part of hexamethylene diisocyanate. The solution is well mixed, flowed on glass plates, and the flow-outs are baked for one hour at 100° C. The baked films show greatly improved toughness and adhesion in comparison with other polyether resins. The drier alone has no effect on the polyether resin.

These polyether resins as more particularly defined in Patent 2,060,715 are the reaction products of substantially unpolymerizable monomeric polyhydric phenols with an organic polyhalide free of ester groups whose halogen atoms are all attached to different carbon atoms which are in turn joined to other atoms by single bonds only.

Example IV

The following compositions were prepared: (1) A 50 per cent solution of a 52 per cent linseed oil modified alkyd resin in hydrocarbon solvent, (2) 4 parts of composition 1 and 0.005 part of a 2 per cent solution of cobalt naphthenate in mineral spirits, (3) 4 parts of composition 1 and 0.2 part of hexamethylene diisocyanate, and (4) 4 parts of composition 1, 0.005 part of a 2 per cent solution of cobalt naphthenate in mineral spirits, and 0.2 part of hexamethylene diisocyanate. Films were flowed from each of the above compositions and baked at 100° C. Composition 1 was still tacky after 60 minutes, composition 2 was tack-free in 40 minutes, composition 3 was tack-free in 60 minutes, and composition 4 became tack-free in 10 minutes. This example indicates clearly the accelerating effect of cobalt drier on the reaction of diisocyanates with oil modified alkyd resins.

Example V

To 100 parts of a 60 per cent xylene solution of a 50 per cent hydrogenated coconut oil modified glycerol phthalate resin of acid number 1.4 and hydroxyl number 19.0 (prepared in xylene solution by the method of Patent 2,057,765) are added 6 parts of hexamethylene diisocyanate and 2 parts of a solution containing 2 per cent cobalt as the naphthenate (0.1 per cent cobalt based on the content of the resin). After stirring at 25° C. until the diisocyante is dissolved, this coating composition is ready for use. Films baked for one hour at 100° C. are dry to the touch, whereas films prepared in the same manner but omitting either the diisocyante or the drier are still tacky after one hour's baking at 100° C.

Example VI

A low molecular weight polyester of acid number 5.2 was prepared by heating for 15 hours at 200–210° C. a mixture of 377 parts of ethylene glycol, 438.2 parts of adipic acid, and 444.1 parts of phthalic acid. Twenty-nine parts of this polymer, which was very soft, was placed in a beaker and heated at 185° C. to a clear melt; 0.067 part of a solution of 2 per cent cobalt in the form of the naphthenate was added; and then 4 portions of 0.25 part of hexamethylene diisocyanate were added at about one minute intervals. After heating and stirring for about 10 minutes the mass became very viscous, and the reaction was allowed to cool down. The high molecular weight polymer obtained is not tacky and is quite tough. It could be pressed out into strong elastic films. In the presence of the cobalt salt at least 20 minutes heating is required to obtain a polymer of comparable molecular weight.

Example VII

A mixture containing 195.5 parts of ethylene glycol, 109.0 parts of ethanolamine, 723.1 parts of adipic acid, and 100 parts of water was gradually warmed to 170° C. (During this time the water distilled off. It was then heated for 2 hours at 170° C. atmospheric pressure, and 6 hours at 200° C. at 2 mm. pressure. The product, a low molecular weight polyester-amide, was a soft wax having an acid number of 29.2.

A mixture of 740 parts of this wax, 40 parts of hexamethylene diisocyanate, and 2 parts of a solution of cobalt drier catalyst was heated in a W. & P. mixer at 170° C. for ¾ hour. The final product was a tough rubbery mass, insoluble in the usual polyester-amide solvents. A soluble product is obtained when the heating period is of much shorter duration.

Similar results are obtained with polyester-amides derived from glycols, diamines, and dibasic carboxylic acids.

*Example VIII*

A mixture was prepared of 25 parts of a 50 per cent solution of a castor oil modified alkyd resin, and to this was added 0.1 per cent manganese naphthenate (based on the resin). A similar mixture was prepared with the omission of the manganese drier catalyst. To 14 parts of each of these mixtures was added 0.3 part of hexamethylene diisocyanate; films were prepared and baked at 110° C. for ½ hours. The film containing the manganese drier was harder than the control. The drier alone has no effect on a castor oil modified alkyd resin.

*Example IX*

Three samples were prepared using the following ingredients: (1) p-phenylphenol-formaldehyde resin, 9.5 parts (control); (2) p-phenylphenol-formaldehyde resin, 9.5 parts and 0.5 part hexamethylene diisocyanate; (3) p-phenylphenol-formaldehyde resin, 9.5 parts; hexamethylene diisocyanate, 0.5 part; and 0.05 part of a solution containing 2 per cent of cobalt as the naphthenate. The above samples were ground very thoroughly to insure good mixing, and then chips were molded at 180° C. and 6000 lbs./sq. in. pressure. All of the chips were clear and light brown colored. Number 1 was completely soluble in xylene, number 2 was slightly soluble, and number 3 was insoluble in xylene. The drier alone has no effect on the phenol formaldehyde resin.

*Example X*

Compositions were prepared by adding the following ingredients to 4 parts of an approximately 50 per cent linseed oil modified glyceryl phthalate alkyd resin.

A. 0.2 part of decamethylene diisocyanate and 0.005 part of cobalt (in the form of the naphthenate salt in naphtha solution).

B. 0.2 part of decamethylene diisocyanate.

C. 0.005 part of cobalt (in the form of the naphthenate salt in naphtha solution).

These mixtures, and also some of the original unmodified resin, were cast into films and baked at 100° C. The film containing diisocyanate and cobalt drier (A) was tack-free in 10–20 minutes. The composition containing only diisocyanate (B) became tack-free in 45 minutes whereas the other films (C and the unmodified resin) required more than one hour to become tack-free.

The metallic compounds mentioned in the examples may be replaced by the organic compounds of other metals, such as iron, vanadium, copper and cerium, which are less frequently used as driers. Other compounds which show somewhat less ability to catalyze the reaction are the chromuim, uranium, nickel, and tin compounds. The organic residues to which the above mentioned metals can be attached are quite varied, the limiting factor for the most part being solubility of the compound in organic solvents. Of the many acids whose metallic salts are useful as catalysts are such aliphatic acids as stearic, oleic, linoleic, myristic, and other long chain fatty acids. Aromatic, hydroaromatic, and alicyclic acids of sufficient carbon content to insure appropriate solubility are also useful. The amount of metallic salt used is from about 0.001 to 5%, preferably from 0.01 to 1.0%, based on the weight of the —N=C=X compound.

Among the useful isocyanates and isothiocyanates are polymethylene diisocyanates and diisothiocyanates, such as ethylene diisocyanate, trimethylene diisocyanate, pentamethylene diisocyanate, tetramethylene diisothiocyanate, etc.; alkylene diisocyanates such as propylene-1,2-diisocyanate, butylene-1,2-diisocyanate, butylene-1,3-diisocyanate, butylene-2,3-diisocyanate, and butylene-1,3-diisothiocyanate; alkylidene diisocyanates and diisothiocyanates such as ethylidene diisocyanate $(CH_3CH(NCO)_2)$, propylidene-1,1-diisocyanate $(CH_3CH_2CH(NCO)_2)$, butylidene diisocyanate, and heptylidene diisothiocyanate $(CH_3(CH_2)_5CH(NCS)_2)$; cycloalkylene diisocyanates and diisothiocyanates such as cyclopentylene-1,3-diisocyanate, cyclohexylene-1,2-diisocyanate, cyclohexylene-1,4-diisocyanate, and cyclohexylene-1,2-diisothiocyanate; cycloalkylidene diisocyanates and diisothiocyanates such as cyclopentylidene diisocyanate $((CH_2)_4C(NCO)_2)$, cyclohexylidene diisocyanate $((CH_2)_5C(NCO)_2)$; aromatic diisocyanates and diisothiocyanates such as o-phenylene diisocyanate, 1-methyl-2,4-phenylene diisocyanate, diphenylene-4,4'-diisocyanate, or toluylene diisothiocyanate; aliphatic aromatic diisocyanates or diisothiocyanates such as xylylene-1,4-diisocyanate

$(OCNCH_2C_6H_4CH_2NCO)$ and diisocyanates or diisothiocyanates containing hetero-atoms such as $SCNCH_2OCH_2NCS$ and $SCN(CH_2)_3S(CH_2)_3NCS$. The diisocyanate and diisothiocyanate are of the general formula

XCNRNCX in which X is oxygen or sulfur, and R is a divalent organic radical, preferably a hydrocarbon radical. The invention is also applicable to reactions of isocyanates and isothiocyanates containing more than two —N=C=X groups, e. g. benzene-1,2,4-triisothiocyanate and 1,2,2-triisocyanobutane.

The active hydrogen containing substances with which the isocyanate or isothiocyanate is reacted preferably have a plurality of groups containing reactive hydrogen. Examples of such substances, in addition to those mentioned in the foregoing examples are diols, i. e. compounds having two hydroxyls, whether phenolic or alcoholic; dithiols, whether thiophenolic or mercaptan; diamino compounds, whether primary or secondary; dicarboxylic acids; and compounds containing mixed functional groups, e. g. hydroxycarboxylic acids, aminoalcohols, aminoacids, and the like. Specific examples of the foregoing types are ethylene glycol, diethylene glycol, hexamethylene glycol, decamethylene dithiol, thioresorcinol, decamethylene glycol, resorcinol, p,p'-dihydroxydiphenyl, phthalic acid, adipic acid, 12-hydroxydecanoic acid, hexamethylenediamine, phenylenediamine, ethanolamine, and N-phenyldiethanolamine. Among substances containing more than two reactive hydrogen-containing groups may be mentioned glycerol, sorbitol, triethanolamine, dextrin, starch, cellulose, nitrocellulose, ethyl cellulose, cellulose acetate, polyvinyl acetals, polyvinyl ketals, polyvinyl alcohol, citric acid, polyacrylic acid, polyfumaric acid, diethylenetriamine, polyvinyl mercaptan, shellac, and other resins. Other substances of this class are proteins and synthetic polyamides, e. g. polyhexamethylene adipamide.

The reaction between the —N=C=X compound and the reactive hydrogen-containing substance can be carried out in the presence of other materials, e. g. fillers, diluents, plasticizers, pigments, etc. It is also possible to use a plurality of —N=C=X compounds and/or a plurality of substances containing reactive hydrogen in the same reaction mixture.

It will be apparent from the foregoing discussion that this invention provides a valuable improvement in the reaction of isocyanates and isothiocyanates with substances containing reactive hydrogen atoms since it brings about a marked increase in the rate of reaction. Thus by the addition of a small amount of diisocyanate and cobalt drier to a drying oil modified alkyd resin it is possible to shorten the drying time at 100° C. from 40–60 minutes (the time required in the presence of diisocyanate or cobalt drier alone) to 10 minutes. This is important in the field of coating compositions.

The hydrogen containing substance which is treated according to the process of this invention may be in many forms. It may be in solution or in the form of manufactured articles, e. g. films, filaments, yarns, fabrics, molded articles and coatings. Thus the treatment of cellulosic materials in the form of fabrics brings about an improvement in waterproofness which is relatively fast to ordinary laundering or dry-cleaning. Examples of fabrics in which this procedure is desirable are showerproof dresses, suits and coats, tablecloths, doilies, etc.; in fact, cotton or cellulose-containing fabrics in general. Paper may also be given water repellent properties by this treatment. The production of water repellent textile materials by this means is superior to methods involving filling of the interstices of the fabric or surface coating the fiber in that the goods are left substantially unchanged in appearance and feel. It is also superior to methods involving simple mechanical impregnation of the water repellent agent in that the water repellent effect is not readily removed by laundering.

As many apparently widely different embodiments of this invention may be made without departing from the spirit and scope thereof, it is to be understood that I do not limit myself to the specific embodiments thereof except as defined in the appended claims.

I claim:

1. A process which comprises reacting, at a temperature of about 100° to 200° C. in the presence of an oil-soluble carboxylic acid salt of a siccative metal which siccative metal salt of itself accelerates the air drying of films of drying oils, an organic substance containing an active hydrogen with an organic compound free from reactive substituents and containing at least one group of the formula —N=C=X attached to carbon in which X is an element selected from the class consisting of oxygen and sulfur.

2. A process which comprises reacting an organic polyisocyanate which is free from reactive substituents and in which the isocyanate groups are attached to carbon, with heat treatment in the presence of an oil-soluble carboxylic acid salt of a siccative metal which siccative metal salt of itself accelerates the air drying of films of drying oils, with an organic substance having at least one group containing an active hydrogen.

3. A process which comprises reacting a polyisothiocyanate which is free from reactive substituents and in which the isothiocyanate groups are attached to carbon, with heat treatment in the presence of an oil-soluble carboxylic acid salt of a siccative metal which siccative metal salt of itself accelerates the air drying of films of drying oils, with an organic substance having at least one group containing an active hydrogen.

4. The process set forth in claim 1 in which said substance contains at least one hydroxyl group.

5. The process set forth in claim 1 in which said substance is a polymeric material containing at least one hydroxyl group.

6. The process set forth in claim 2 in which said organic substance is an alkyd resin.

7. The process set forth in claim 3 in which said organic substance is an alkyd resin.

8. A process for obtaining high molecular weight polymers which comprises reacting, with heat treatment in the presence of an oil-soluble aliphatic carboxylic acid salt of a siccative metal which siccative metal salt of itself accelerates the air drying of films of drying oils, a low molecular weight organic polymer containing active hydrogen with a diisocyanate which is free from reactive substituents and in which the isocyanate groups are attached to carbon.

9. A process for obtaining high molecular weight polymers which comprises reacting, with heat treatment in the presence of an oil-soluble aliphatic carboxylic acid salt of a siccative metal which siccative metal salt of itself accelerates the air drying of films of drying oils, a low molecular weight organic polymer containing active hydrogen with a diisothiocyanate which is free from reactive substituents and in which the diisothiocyanate groups are attached to carbon.

10. A process which comprises reacting a diisocyanate which is free from reactive substituents and in which the isocyanate groups are attached to carbon, with heat treatment in the presence of an oil-soluble aliphatic carboxylic acid salt of a siccative metal which siccative metal salt of itself accelerates the air drying of films of drying oils, with an incompletely formed polymer comprising the reaction product of a dibasic carboxylic acid and a compound containing two groups reactive toward carboxyl groups, at least one of said groups being hydroxyl.

HENRY S. ROTHROCK.